United States Patent Office 3,192,557
Patented July 6, 1965

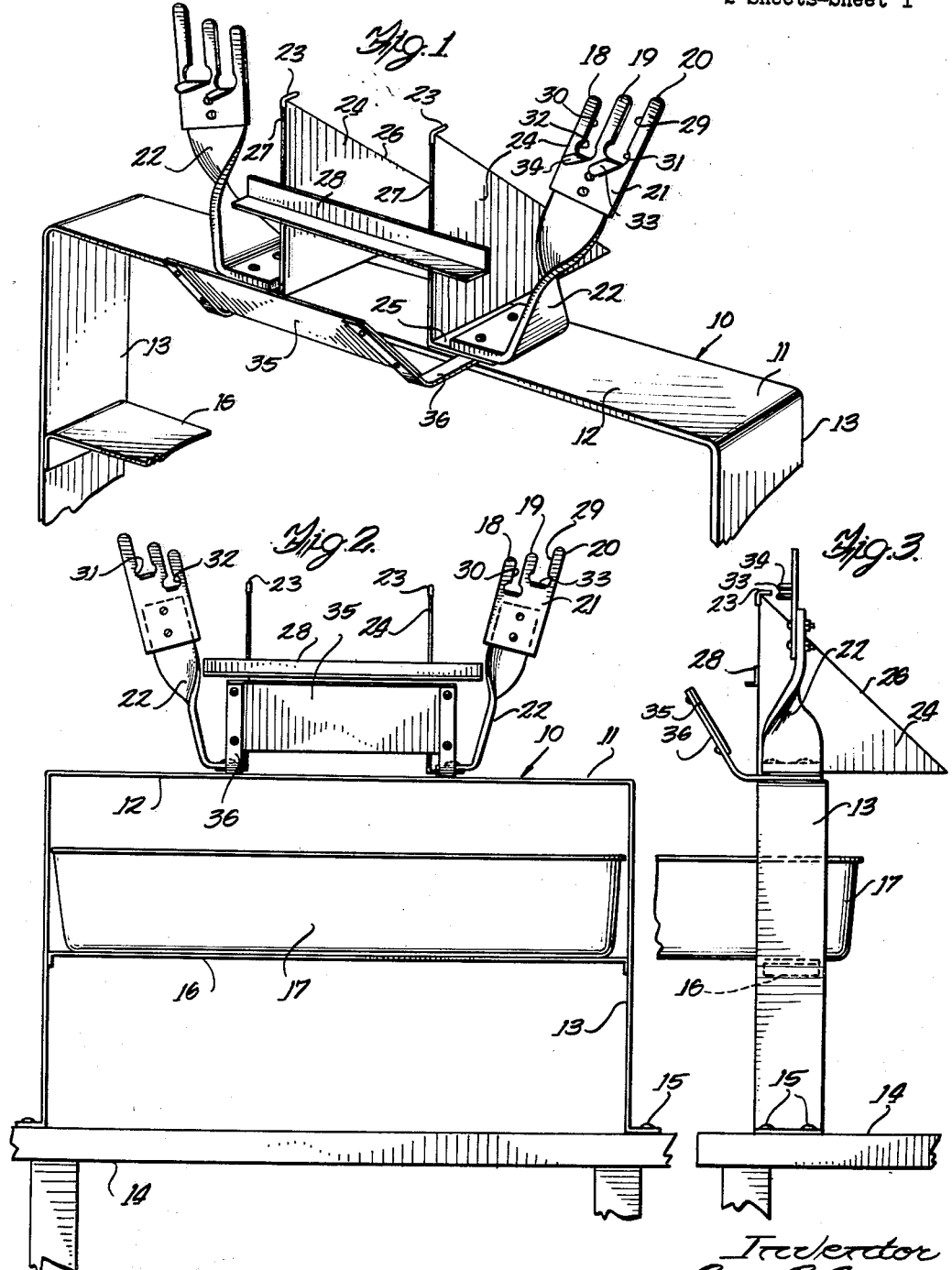

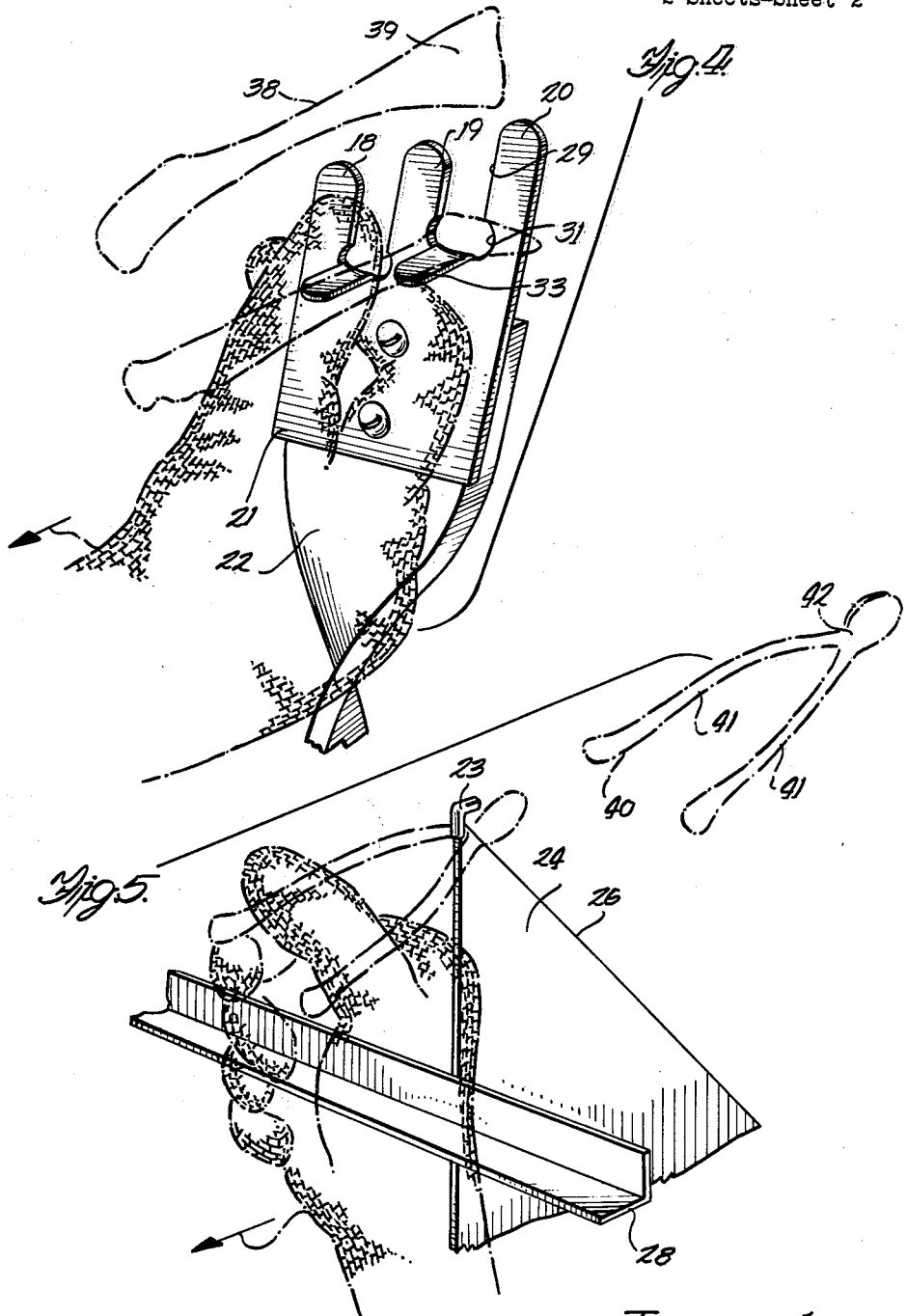

3,192,557
FIXTURE FOR STRIPPING MEAT FROM BONES
Asa B. Segur, 1185 S. Ridgeland Ave., Oak Park, Ill.
Filed Sept. 25, 1962, Ser. No. 226,005
5 Claims. (Cl. 17—1)

This invention relates to a fixture for use in stripping meat from bones in commercial boning operations and is particularly useful in connection with the removal of meat from the bones of poultry carcasses.

In my copending application, Serial No. 79,339, filed December 29, 1960, I disclose an apparatus and method for removing meat from cooked breast sections of poultry carcasses. As part of the method disclosed therein, the clavicle of each breast section is broken away or disconnected at its articulation with the coracoids and is directed to another station where any meat remaining upon the clavicle may be manually stripped therefrom. In addition, the coracoids themselves may be separated from the remainder of the breast section and, like the clavicle, may be directed to a separate meat removal station.

A principal object of the present invention is to provide a fixture which is particularly suited for increasing the speed and efficiency of meat removal from bones such as the disjointed clavicles and coracoids of poultry carcasses. Another object is to provide a fixture which permits a single operator to remove meat from two bones at the same time, each hand being used to clean one of the bones. Another object is to provide a bone cleaning method in which the danger of bone breakage, and the related danger of product contamination by small bone fragments, are substantially eliminated or at least greatly reduced.

Other objects will appear from the specification and drawings in which:

FIGURE 1 is a broken perspective view of a fixture embodying the present invention;

FIGURE 2 is a front elevational view of the fixture;

FIGURE 3 is a side elevational view of the fixture;

FIGURE 4 is a perspective view illustrating the use of a portion of the fixture;

FIGURE 5 is another broken perspective view illustrating the use of a different portion of the fixture.

In the embodiment of the invention illustrated in the drawings, the numeral 10 generally designates a fixture particularly adapted for use in the removal of meat from the clavicles and coracoids of cooked poultry carcasses. The fixture includes an inverted U-shaped frame 11 having a horizontal top portion 12 and a pair of depending legs 13 adapted to be secured to a support table 14 by screws 15 or by any other suitable connecting means. A shelf 16 bridges the legs 13 intermediate the upper and lower ends thereof and supports a suitable pan 17 beneath and in front of top wall 12. Preferably the frame is mounted with its front edges near an edge of support table 14 so that an operator may easily reach the bone-engaging elements affixed to the top of the stationary frame.

For holding relatively large bones, such as coracoids, I provide two sets of spaced, parallel, and upstanding finger elements 18, 19 and 20, each set being integrally formed as part of a generally vertical plate 21 which is in turn ridgedly connected to frame 11 by an upstanding extension bracket 22. Smaller bones, particularly clavicles, are intended to be held by the small finger elements 23 affixed to the upper ends of upstanding triangular plates 24. In the illustration given, it will be observed that the paired triangular plates 24 are spaced laterally apart and have outwardly turned flanges 25 which are bolted or otherwise secured rigidly to the frame 11 by the same connecting means which hold the bracket extensions for plates 21 in place. The two sets of elements for supporting the coracoid bones are spaced laterally to the outside of the parallel plates 24.

Each triangular mounting plate 24 has a downwardly and rearwardly sloping rear edge 26 which, as will be brought out more clearly hereinafter, is directed towards a suitable pan or other receptacle (not shown) for receiving cleaned and discarded bones. The vertical front edges 27 of the parallel upstanding plates 24 are connected by a horizontal brace 28 which not only reinforces the plates but also serves as a temporary stop for limiting the extent of downward sliding movement of clavicles supported by the plates.

The finger elements 23 are in the form of small hooks which have their front portions extending vertically and welded or otherwise secured to the upper front edges of plates 24 and have their rear portions extending outwardly or rearwardly from the extreme upper corners of the plates.

Finger elements 18, 19 and 20, already described as being formed as an integral part of plates 21, are spaced apart to define generally vertical slots 29 and 30 therebetween. While the two slots are of different size, slot 29 being larger than slot 30, the edges defining each slot are substantially uniformly spaced apart except at the bottoms of the slots where enlarged openings 31 and 32 are provided. Referring to FIGURE 2, it will be noted that opening 31 is slightly larger than opening 32. At the lower limits of the openings, each plate 21 is provided with forwardly projecting flanges or tongues 33 and 34.

Spaced in front of the parallel triangular plates 24 is a downwardly and rearwardly inclined deflector plate 35. The deflector plate is carried by straps 36 affixed to the frame and has its lower rear edge spaced in front of the forward edge of top wall 12 so that material striking the plate will be directed downwardly into pan 17.

Plates 21 and 24 are arranged in pairs so that an operator may use both hands in removing meat from two similar bones at the same time. Since the function of the parts on each side of the unit is identical and since the action of the operator's hands is the same, FIGURES 4 and 5 show the operation of only one side of the unit, and the action of only the right hand of an operator, to simplify disclosure of the use of the fixture.

In the stripping of meat from a coracoid bone, such bone being indicated by broken lines 38 in FIGURE 4, an operator first grips the distal end of the bone (i.e., the end which articulates with the clavicle) between his thumb and his first or second finger and inserts the proximal extremity of the coracoid into one of the slots 29 or 30. The wider slot 29 is used for the coracoids of larger fowl, such as turkeys or cocks, while the smaller slot 30 is used for the coracoids of hens and smaller chickens generally.

Insertion of the proximal portion 39 of the coracoid 38 into one of the slots is facilitated because of the unequal length of fingers 18, 19 and 20. The longer of the fingers defining the selected slot may be used as a guide against which the end portion of the coracoid may be urged laterally before it is pushed downwardly into the slot.

The coracoids of poultry have flattened proximal ends (flattened cranial and caudal surfaces) and it is this flattening and outward flaring that is advantageously used in anchoring a bone within the fixture so that longitudinal movement of the bone in at least one direction will be effectively prevented. The width of the selected slot 29 or 30 is slightly greater than the thickness of the intermediate portion of the coracoid and, therefore, this intermediate portion may be easily moved downwardly into the slot if the bone is held horizontally as it is urged downwardly. However, the width of the coracoid's flattened proximal end is wider than either the slot 29 (or 30) or the opening 31 (or 32) and therefore, when the bone has been lowered through the slot and into the opening and is held so that its flattened surfaces face upwardly and downwardly, it cannot be completely withdrawn by being pulled longitudinally forwardly through that opening. The bone is therefore locked in place for the stripping of meat therefrom.

With releasing the grip by his thumb and first (or second) fingers, the operator pulls forwardly over the anchored bone to pull the meat towards the distal extremity of the bone. The connection between the meat and the bone's distal end is readily broken by a twisting action of the hand, and the stripped meat is then dropped upon the deflector plate and is directed by the plate into the receiving pan 17 therebelow. Throughout this operation, the bone is held in substantially horizontal position with its flattened proximal surfaces facing upwardly and downwardly by tongue 33 or 34 and by the close fit between the bone's proximal end portion and the edges defining openings 31 or 32.

Removal of the cleaned bone is easily accomplished by simply rotating the bone 90 degrees and then lifting it or pulling it out of the slot since the width of the slot is greater than the thickness of the coracoid at its proximal end, i.e., greater than the distance between its flattened proximal surfaces. As an alternative, removal may be accomplished by urging the bone longitudinally rearwardly until its intermediate portion rests within the opening and thereafter lifting or flicking it upwardly out of the opening and slot.

Meat is removed from a clavicle 40 in a similar manner; that is, the bone is anchored against longitudinal movement in a forward direction and, with the bone so anchored, the meat is stripped forwardly therefrom. A clavicle 40, with its rami 41 held between the thumb and first finger of one hand, is hooked over the upper corner of plate 24 so that the hypocleidium 42 will engage and be restrained by the upwardly and rearwardly extending finger element 23. When the clavicle is in this position, its rami will extend forwardly and generally horizontally from opposite sides of finger element 23, as illustrated in FIGURE 5. Continued forward movement of the operator's fingers after forward movement of the clavicle is restrained results in the stripping of meat from the rami. Preferably, only one hand is used to remove meat from both rami in a single stripping action, as indicated in FIGURE 5.

The meat removed by the stripping action is dropped upon the deflector plate 35 and is directed into the pan 17. Upon release, the clavicle rides downwardly along the downwardly and rearwardly inclined edge 26 of plate 24 and is directed into a suitable waste receptacle (not shown). While the horizontal member 28 does not normally interfere with the downward sliding movement of a bone from which all of the meat has been stripped, it will tend to restrain such movement if meat remains connected to the ends of the rami and, therefore, it will automatically prevent the discarding of a bone until substantially all of the meat has been stripped therefrom.

Since an operator performs the same operation on two similar bones at the same time, it is believed apparent that the fixture of the present invention is extremely useful in any commercial operation where a large number of bones must be cleaned thoroughly and quickly. In this connection, it has been found that meat removed from bones by the use of this fixture tends to be more chunky and less stringy than meat removed from the same bones by conventional techniques and, therefore, such meat can be used for dicing and is of generally greater value.

In FIGURES 4 and 5, the hand of the operator is illustrated with a wire mesh glove. It has been found that such a glove greatly assists in the stripping of meat from the bones; however, the same operation may be performed somewhat less efficiently without the use of such gloves.

While in the foregoing I have disclosed an embodiment of the present invention in considerable detail for purposes of illustration, it will be understood by those skilled in the art that many of these details may be varied without departing from the spirit and scope of the invention.

I claim:

1. A fixture for use in stripping meat from poultry bones comprising a stationary frame, a generally vertical plate rigidly secured at its lower end to said frame and providing a free upper end portion, a pair of spaced parallel upstanding finger elements projecting upwardly from the upper free end portion of said plate and defining a generally vertical slot therebetween, said slot being wider than the narrowest cross-sectional dimensions of the proximal end portion of a coracoid bone to be received therein but being narrower than the largest cross-sectional dimension of said bone at said proximal end portion, and an enlarged opening at the base of said slot, said opening being narrower than the largest cross-sectional dimension of the proximal end of said coracoid bone, whereby the proximal end portion of a coracoid bone may be inserted into said opening through said slot and then rotated within said opening to lock said bone against longitudinal movement in one direction.

2. The structure of claim 1 in which said fixture is provided with a horizontal tongue at the lower limits of said opening to support a coracoid bone in generally horizontal position.

3. A fixture for use in stripping meat from clavicle bones comprising a stationary frame, an upstanding plate rigidly secured to said frame having a downwardly and rearwardly inclined edge, and a hook rigidly secured to the upper end of said plate and projecting outwardly over a portion of said rear edge, whereby, a clavicle may be drawn forwardly until the hypocleidium thereof is restrained by said hook, the rami of said clavicle extending forwardly about opposite sides of said plate for the stripping of meat as it is pulled forwardly therefrom, said inclined edge directing downward movement of said clavicle after the meat has been stripped therefrom.

4. The structure of claim 3 in which a horizontal member is disposed below and in front of said hook for preventing downward sliding movement of a clavicle along the sloping rear edge of said plate when meat connected to said rami engages said member.

5. A fixture for use in the stripping of meat from bones comprising a stationary frame, a generally vertical plate rigidly secured at its lower end to said frame and providing a free upper end portion, a hook projecting upwardly and rearwardly from the free upper end portion of said plate for engaging the hypocleidium of a clavicle and restraining forward movement of the same, said plate having a downwardly and rearwardly inclined edge below said hook for directing downward and rearward movement of a clavicle after meat has been stripped therefrom, and a pair of upstanding finger elements mounted upon said frame and spaced apart to define an upwardly opening slot therebetween, said slot terminating at its lower end in an enlarged opening, and a generally horizontal tongue projecting forwardly from the lower edge of said opening for suporting a bone extending therethrough.

References Cited by the Examiner

UNITED STATES PATENTS 2,785,437 3/57 Standley et al. _____ 17—11
2,897,536 8/59 Bergstrom et al. _____ 17—1

SAMUEL KOREN, Primary Examiner.

LUCIE H. LAUDENSLAGER, Examiner.